(No Model.)
A. WALKER.
DRILL JAR REAMER.
No. 389,347. Patented Sept. 11, 1888.
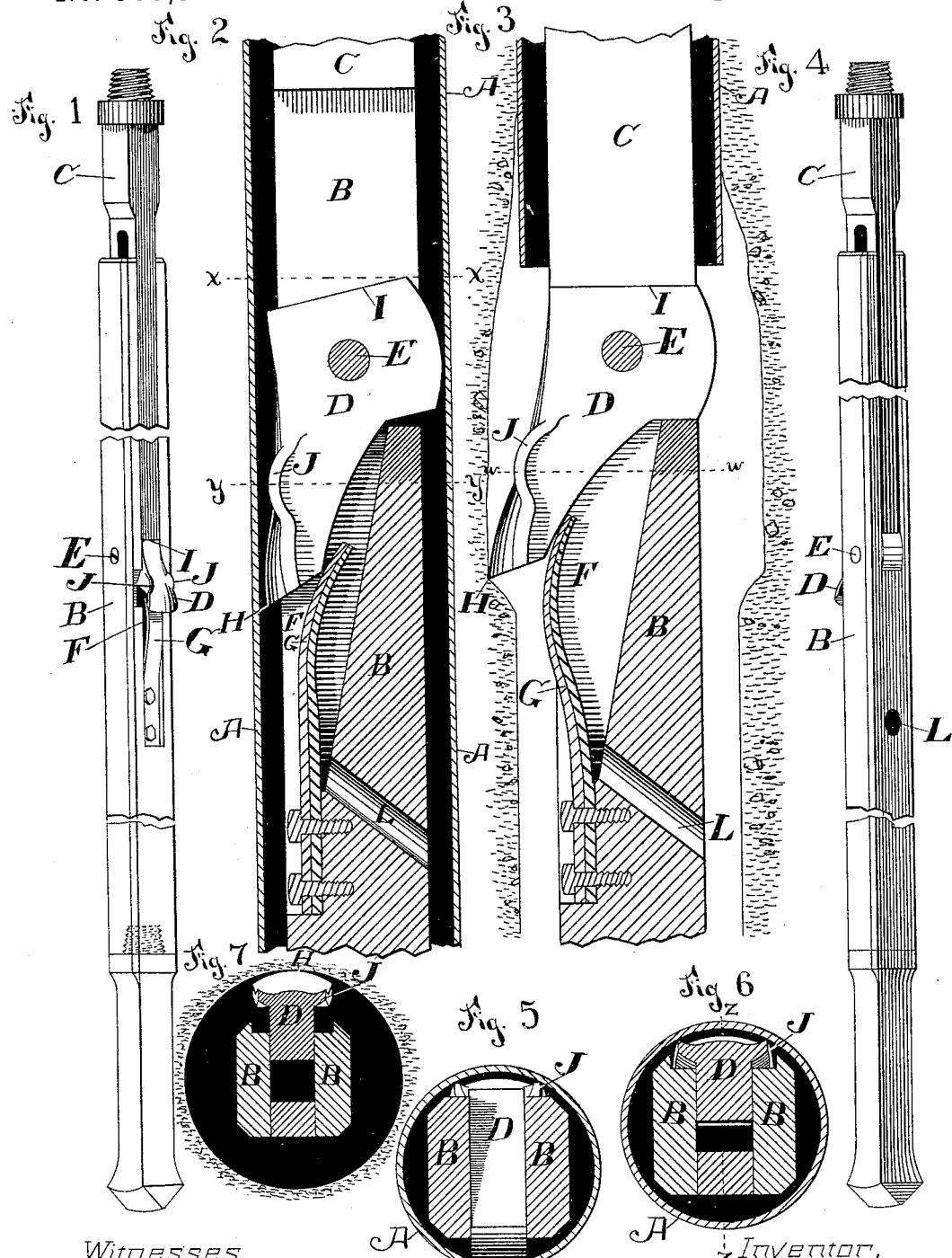

UNITED STATES PATENT OFFICE.

ALFRED WALKER, OF SAN LUIS OBISPO, CALIFORNIA, ASSIGNOR OF ONE-HALF TO FREDERICK ADAMS, OF SAME PLACE.

DRILL JAR-REAMER.

SPECIFICATION forming part of Letters Patent No. 389,347, dated September 11, 1888.

Application filed February 2, 1888. Serial No. 262,777. (No model.)

*To all whom it may concern:*

Be it known that I, ALFRED WALKER, a citizen of the United States, residing at San Luis Obispo, in the county of San Luis Obispo and State of California, have invented a new and useful Improvement in Drill Jar-Reamers, of which the following is a specification.

My invention relates to machines for boring wells.

The object of my invention is to devise a simple and effective machine which will ream out the hole which is below the tubing of a well, so as to allow the tubing to slip down freely, and which will not cut into the tubing while being passed through. This I accomplish by means of the device described herein, and illustrated in the accompanying drawings, in which—

Figure 1 is a perspective view of my invention with portions thereof broken away to contract the view. Fig. 2 is a vertical mid-section on line Z Z, Fig. 6, leaving the reaming dog intact, however, to show one of the lips J. This view illustrates the position of the reaming-dog while the tool is passing through the tubing. Fig. 3 is a similar section showing the reamer in operation below the pipe. Fig. 4 is a rear view of Fig. 1. Fig. 5 is a cross-section on line X X, Fig. 2. Fig. 6 is a cross-section on line Y Y, Fig. 2. Fig. 7 is a cross-section of Fig. 3 on line W W.

A is the tubing of the well.

B is the drill-stock.

C is the jar.

D is the reaming-dog mounted on an axle, E, within a slot, F, in the drill-stock. A spring, G, presses against the inner side of the dog at the lower end thereof to force the lower end of the dog out from the face of the stock, so that when the dog is not pressed into the slot it will be held in the position shown in Fig. 3, whereby the cutting edge H of the reamer is thrown beyond the line cut by the drill. The upper face, I, of the dog is flat; and when the lower end of the dog is thrown out by the spring, as shown in Fig. 3, the upper face, I, is at right angles with the drill-stock. The end of the jar strikes upon the face I squarely and drives the drill and dog downward.

It will be observed that when the end of the jar rests upon the upper face, I, of the dog it will prevent the dog from being forced back into the slot. This appears clearly in Fig. 2. When the dog is pressed back into the slot, the upper face of the dog will be at an angle with the face of the end of the jar, and when the jar strikes thereon the weight of the jar will force the dog to assume the position shown in Fig. 3—that is to say, the cutting-edge H of the dog will be thrown out, so as to cut the walls of the hole.

In order to prevent the cutting-edge of the dog from striking into the pipe while passing down therethrough, I provide lips J J, which project outward from the sides of the dog. These lips are mounted on the dog between the cutting-edge thereof and the point at which the axle passes through the dog, so that they will not move through so large an arc as the cutting edge of the dog. It will be seen that when the dog is pressed back into the position shown in Fig. 2 the lips J J will project farther from the face of the drill than does the cutting-edge of the dog. When the dog has passed below the end of the tubing, the spring will force the cutting-edge out, so that it will project beyond the plane in which the lips J J move, thus striking into and cutting the wall of the hole, as shown in Figs. 3 and 7.

I provide a passage-way, L, to drain the slot F and prevent it from becoming filled with débris which might prevent the dog from being forced back when it is drawn out through the tubing.

When the drill is drawn up to remove it from the well, the lips J J will strike upon the tube and be thereby thrust back, thus throwing the dog back to allow the drill to pass through the tubing.

What I claim as new, and desire to secure by Letters Patent, is—

1. The combination of the jar, the stock of the drill, the dog D, provided with the cutting-edge H, and pivoted to the stock of the drill, the axle E, and the spring G.

2. In a drill substantially such as described, the pivoted reaming-dog D, provided with the cutting-edge H and the lips J J.

3. The combination of the jar, the stock of the drill, the dog D, provided with the cutting-edge H and the lips J J, and pivoted to the stock, the axle E, and spring G.

ALFRED WALKER.

Witnesses:
 JAS. R. TOWNSEND,
 A. C. CONNER.